(12) United States Patent
Patel et al.

(10) Patent No.: US 9,380,092 B2
(45) Date of Patent: Jun. 28, 2016

(54) METHOD AND SYSTEM FOR INSERTING CONTENT INTO STREAMING MEDIA AT ARBITRARY TIME POINTS

(71) Applicant: GOOGLE INC., Mountain View, CA (US)

(72) Inventors: Indravadan Vipinbhai Patel, Toronto (CA); Gregory Robert Philpott, Toronto (CA); Christopher Gary Dinn, Toronto (CA)

(73) Assignee: Google Inc., Mountain View, CA (US)

( * ) Notice: Subject to any disclaimer, the term of this patent is extended or adjusted under 35 U.S.C. 154(b) by 347 days.

(21) Appl. No.: 13/865,646

(22) Filed: Apr. 18, 2013

(65) Prior Publication Data

US 2013/0282915 A1    Oct. 24, 2013

Related U.S. Application Data

(60) Provisional application No. 61/635,222, filed on Apr. 18, 2012.

(51) Int. Cl.
*G06F 15/16* (2006.01)
*H04L 29/06* (2006.01)
*H04N 21/234* (2011.01)
*H04N 21/845* (2011.01)
*H04N 21/44* (2011.01)

(52) U.S. Cl.
CPC ............. *H04L 65/60* (2013.01); *H04L 65/602* (2013.01); *H04N 21/23424* (2013.01); *H04N 21/8456* (2013.01); *H04N 21/44016* (2013.01)

(58) Field of Classification Search
CPC .......... H04N 21/812; H04N 21/23424; H04N 21/44016; H04N 21/458; H04N 21/8455

USPC ......................................................... 709/231
See application file for complete search history.

(56) References Cited

U.S. PATENT DOCUMENTS

| 6,792,047 | B1 | 9/2004 | Bixby et al. |
| 7,548,565 | B2 | 6/2009 | Sull et al. |
| 8,145,782 | B2 | 3/2012 | McGowan et al. |
| 2004/0158858 | A1 | 8/2004 | Paxton et al. |

(Continued)

FOREIGN PATENT DOCUMENTS

| CA | 2574998 A1 | 2/2006 |
| WO | 2011150293 A1 | 12/2011 |
| WO | 2012074762 A1 | 6/2012 |

OTHER PUBLICATIONS

Related PCT International Application No. PCT/CA2013/000624 International Search Report dated Oct. 18, 2013.

(Continued)

*Primary Examiner* — Glenton B Burgess
*Assistant Examiner* — Imran Moorad
(74) *Attorney, Agent, or Firm* — Foley & Lardner LLP; John D. Lanza (57) ABSTRACT

The present invention teaches a method and system of inserting content into streaming media programs without requiring re-encoding and/or re-segmenting of the program, thus allowing the insertion point within the media program to be selected as desired. The system and method operate on the relevant chunks of the streaming program to repackage those chunks, even in real time, to provide a chunk boundary at the desired insertion point in the streamed program to permit seamless playback of the main program and inserted content.

9 Claims, 4 Drawing Sheets

(56) References Cited

U.S. PATENT DOCUMENTS

| | | |
|---|---|---|
| 2004/0237102 A1 | 11/2004 | Konig et al. |
| 2007/0089126 A1 | 4/2007 | Fritz et al. |
| 2007/0220566 A1 | 9/2007 | Ahmad-Taylor |
| 2008/0092168 A1 | 4/2008 | Logan et al. |
| 2008/0274752 A1 | 11/2008 | Houri |
| 2009/0049090 A1 | 2/2009 | Shenfield et al. |
| 2009/0077580 A1 | 3/2009 | Konig et al. |
| 2010/0037204 A1 | 2/2010 | Lin et al. |
| 2010/0124907 A1 | 5/2010 | Hull et al. |
| 2010/0228880 A1 | 9/2010 | Hunt et al. |
| 2011/0145858 A1 | 6/2011 | Philpott et al. |
| 2011/0265116 A1 | 10/2011 | Stern et al. |
| 2011/0302307 A1 | 12/2011 | Zhong et al. |
| 2011/0307623 A1 | 12/2011 | George et al. |
| 2011/0307781 A1 | 12/2011 | Sood et al. |
| 2012/0005313 A1 | 1/2012 | McGowan et al. |
| 2012/0030313 A1 | 2/2012 | McGowan et al. |
| 2012/0042050 A1 | 2/2012 | Chen et al. |
| 2012/0042089 A1 | 2/2012 | Chen et al. |
| 2012/0042090 A1 | 2/2012 | Chen et al. |
| 2012/0047542 A1* | 2/2012 | Lewis et al. ............... 725/97 |
| 2012/0059721 A1 | 3/2012 | Blegen |
| 2012/0066285 A1 | 3/2012 | McGowan et al. |
| 2012/0066386 A1 | 3/2012 | McGowan et al. |
| 2012/0072465 A1 | 3/2012 | McGowan et al. |
| 2012/0072541 A1 | 3/2012 | Carls et al. |
| 2012/0072542 A1 | 3/2012 | McGowan |
| 2012/0124624 A1 | 5/2012 | Lau et al. |
| 2012/0185895 A1 | 7/2012 | Wong et al. |
| 2012/0197419 A1 | 8/2012 | Dhruv et al. |
| 2012/0198089 A1 | 8/2012 | Dhruv et al. |
| 2012/0198492 A1* | 8/2012 | Dhruv et al. ............... 725/32 |
| 2012/0254367 A1 | 10/2012 | McGowan |
| 2012/0259946 A1 | 10/2012 | Stockhammer et al. |
| 2013/0060911 A1 | 3/2013 | Nagaraj et al. |
| 2013/0091251 A1 | 4/2013 | Walker et al. |

OTHER PUBLICATIONS

Related PCT International Application No. PCT/CA2013/000624 Written Opinion of the International Searching Authority dated Oct. 18, 2013.
Related PCT International Application No. PCT/CA2013/000628 International Search Report dated Oct. 29, 2013.
Related PCT International Application No. PCT/CA2013/000628 Written Opinion of the International Searching Authority dated Oct. 29, 2013.
Related U.S. Appl. No. 13/938,816 Notices of References Cited dated Nov. 8, 2013.
Corresponding PCT Application No. PCT/CA2013/000379 International Search Report dated dated Jul. 15, 2013.
Corresponding PCT Application No. PCT/CA2013/000379 Written Opinion of the International Searching Authority dated Jul. 15, 2013.
First Australian Examination Report on 2013248891 dated Apr. 6, 2016.

* cited by examiner

METHOD AND SYSTEM FOR INSERTING CONTENT INTO STREAMING MEDIA AT ARBITRARY TIME POINTS

RELATED APPLICATIONS

The present application claims priority from U.S. provisional patent application, Ser. No. 61/635,222, filed Apr. 18, 2012 and the contents of this earlier application are incorporated herein, by reference, in their entirety.

FIELD OF THE INVENTION

The present invention relates to a system and method for inserting content into streaming media. More particularly, the present invention relates to a system and method for inserting content into streaming media at one or more arbitrary time points within the streaming media.

BACKGROUND OF THE INVENTION

The proliferation of the Internet and the general availability of data connections are changing the way media is provided and used. In particular, conventional television and/or radio (i.e.—audio) services are increasingly giving way to digital network-based streaming media on demand and/or live streaming media. Such streaming media content can be delivered through any digital network, such as a cable company's set top box-based network, or increasingly, through the Internet. The delivery can be to any suitable rendering device, such as an Apple TV or an Xbox 360, connected to a television or monitor, or can be to a rendering device and display, such as an Internet TV or a mobile device, such as player software executing on an Apple iPad, a laptop computer, a mobile phone, etc.

In most cases, streaming media is segmented into "chunks" to be delivered through the network to the player. Each chunk will typically contain the video and/or audio information required to render a selected duration, such as ten seconds, of the media at a given resolution.

When a player commences playback of a program, it first downloads one or more chunks of the program into a player cache and begins playback with those chunks while the next needed chunks are being downloaded through the network. In this manner, playback of the program can start before the entire program has been downloaded.

As the market shifts towards delivery of content via such streaming media delivery systems, the ability to advertise in such streaming media has also offered new opportunities to advertisers and content deliverers. For example, it is now possible, when media is requested by a viewer, to select the ads to be shown and/or played during the delivery of the program, the ads being selected based upon any suitable criteria, such as: viewer demographics, including where the player/viewer is located and/or the particular viewer watching the content; the type of device (mobile versus fixed) that the content is being displayed on; etc. In fact, a wide range of demographic and other criteria can be applied to the selection of which advertisements (or other content) will be shown to which viewers and the full range of such considerations will be apparent to those of skill in the art and not be discussed herein.

To date, the playback of content, such as ad content, inserted into a streaming media program has been achieved in one of two manners: namely by having the user's rendering device employ two players, each of which plays one of two streams of media data, and switching between the two players as required; or inserting the content into the main program stream to form a single composite stream for the total media program which is played by a single player on the user's rendering device.

With switching between players, the stream containing the main program is played until a specified time point is reached, when an advertiser or other entity wishes to play other content, and then the rendering device is switched to the second player which plays another stream containing the other content. When the playback of the other content is completed, the rendering device switches back to the first player which recommences playback of the main program from the point at which it was stopped.

While such a player switching system can work, it requires the end user's rendering device to download and appropriately buffer streaming content for both players and this can adversely affect the heuristics and control logic related to managing the downloads through the network.

Further still, the logic and control for switching between players must be implemented at the user's rendering device, which can introduce undesired playback variability (i.e.—potentially allowing the user to "skip" inserted content, etc.).

The more preferred method of playing inserted content is to incorporate the inserted content into the stream of chunks of the media program to form a single, composite, stream. In such single stream broadcast systems, the content to be inserted is inserted into the stream of chunks being downloaded such that the player merely plays a stream of chunks, which stream includes both the media program and the inserted content.

While inserting content into a single stream is a more elegant solution than player switching solutions, it too has until now suffered from some disadvantages. Specifically, because the streaming media program comprises a single stream of chunks comprising both chunks representing the media program and chunks representing the inserted content, the media program must be encoded (compressed and segmented, or "chunked") such that, at the time point where it is desired to play inserted content, the chunk representing the current duration of the media program ends so that the chunk representing the beginning of the inserted content can be played. Thus, to permit the creation of the single stream, the media program must be encoded with prior knowledge of the time points where the insertion of additional content is to occur so that chunk boundaries (i.e.—rendered content end points) can be correctly created.

Therefore, when producing a chunked streaming media program, the content provider must know each and every time point at which it may be desired to insert content into the stream and to ensure that the chunk boundaries containing the program content to be rendered immediately preceding the inserted content end at the desired insertion time point to permit the decoder to seamlessly begin playing the first chunk of the inserted content at that desired time point.

This need to create the chunks of the media program with boundaries at appropriate time points to accommodate the insertion of content has increased the cost of providing the content and has also limited the insertion of content to only those time points in the encoded program that have previously been defined and encoded to provide the necessary chunk boundaries. If it is subsequently desired to insert content at a different time point in the media program, the encoding and segmenting of the media program must be re-performed to ensure that the necessary chunk boundary is created at the newly desired insertion time point.

For example, it may originally have been desired to insert content at the two minute and at the eighteen minute time points within a thirty minute media program. The media program can be encoded and segmented to provide media program chunk boundaries at the desired two minute and eighteen minute time points to enable this. If it is subsequently desired to also insert content at the ten minute point in the media program, it is not possible to do so unless the media program is re-encoded and re-segmented to ensure the necessary media program chunk boundary is also present at the ten minute point.

Problems also exist with single stream broadcast systems for live streaming programs. In such cases, the content provider will decide to insert an advertisement, or other content, "on the fly" during the streaming program. Typically the streaming program is transmitted with some delay, for example seven seconds, and the content provider will indicate to the encoding and segmenting system in the content delivery system, by appropriate signaling means, that content will be inserted some selected amount of time after the appropriate signal has been sent. The encoding and segmenting system then constructs a chunk with a boundary at the desired time point, such that the desired content can be inserted at that time point.

As will be apparent, this time point-specific encoding and segmenting of live program streams places a higher computational load on the encoder, requiring higher performing, and hence higher priced, systems as the encoding and segmenting must be completed within the broadcast delay time. Also, with time-point specific encoding systems, it is not possible for downstream content providers (regional broadcasters, etc.) to insert their own content at different times within the live streaming program without the cooperation of the original content provider as, otherwise, the main program chunk boundaries will not necessarily occur at the required time points.

Accordingly, it is desired to have a system and method of inserting content into a streaming media program to obtain a single stream broadcast, which does not require the presence of chunk boundaries at desired times.

SUMMARY OF THE INVENTION

It is an object of the present invention to provide a novel system and method for inserting content into a streaming media program which obviates, or mitigates, at least one disadvantage of the prior art.

According to a first aspect of the present invention, there is provided a method for inserting content, at at least one specified time point, into a streaming media program defined by a program manifest, the streaming media program being arranged in chunks of data, the method comprising: (i) identifying the chunk of the streaming program which contains the data to render the streaming media program at the specified time point; (ii) repackaging the identified chunk to form first and second replacement chunks, the first replacement chunk including the data of the identified chunk necessary to render the streaming media program up to the specified time point and the second replacement chunk including the data of the identified chunk necessary to render the streaming media program after the specified time point; and (iii) updating the program manifest to replace references to the identified chunk with references to the first and second replacement chunks.

Preferably, the method further comprises the steps of further comprising the steps of: receiving an identification of the content to be inserted at the specified time point; and updating the program manifest to include references to the identified content to be inserted such that the playback of the streaming program will include the inserted content.

Also preferably, when the streaming media program is available at at least two different quality levels, each quality level comprising a different set of chunks of data, and the manifest indicates the chunks in each set, steps (i), (ii) and (iii) of the method are performed for each set of chunks of data.

According to another aspect of the present invention, there is provided a stream repackager to process a streaming media program arranged in chunks of data to enable the insertion of content into the streaming media program at at least one specified program time, comprising: a computing device including at least one processor and a memory and operable to execute a repackaging program; a network interface through which the computing device is operable to read the chunks of data representing the streaming media program through a network and to output the repackaged chunks of data representing the streaming media program to a network; and wherein the repackaging program: operates to receive a request to enable the insertion of content at at least one specified program time within the streaming media program and identifies the chunk of the streaming media program which contains the data to render the streaming media program at the at least one specified program time; operates to repackage the identified chunk to form first and second replacement chunks, the first replacement chunk including the data of the identified chunk necessary to render the program up to the at least one specified program time and the second replacement chunk including the data of the identified chunk necessary to render the program after the at least one specified program time; and operates to update the program manifest to replace references to each identified chunk with references to each first and second replacement chunks.

Preferably, in at least one embodiment the repackaging program forms the first and second replacement chunks only when a player playing the streaming media program attempts to download the respective one of the first or the second replacement chunk.

According to yet another aspect of the present invention, there is provided a streaming content delivery system to deliver a streaming media program to at least one end user rendering device, the system comprising: a content information system including at least metadata describing at least one available streaming program which can be requested by a user; an origin server, operable to store chunks of data representing at least one streaming media program; a stream repackager, operable to receive a program manifest defining the available chunks of data which can be rendered to play the at least one streaming media program and to receive a request to enable the insertion of content at at least one specified program time within the at least one streaming media program and to identify the chunk of the streaming program which contains the data to render the program at the at least one specified program time, to repackage the identified chunk to form first and second replacement chunks, the first replacement chunk including the data of the identified chunk necessary to render the program up to the at least one specified program time and the second replacement chunk including the data of the identified chunk necessary to render the program after the at least one specified program time and to update the program manifest to replace references to each identified chunk with references to each first and second replacement chunk; an insertion manager to modify the updated program manifest to include references to the content to be inserted; and a content delivery network to deliver the modified program manifest to the at least one end user rendering device, the rendering device downloading the chunks of the program and the inserted content via the content delivery network and in accordance with the modified program manifest and rendering the streaming media program and the inserted content accordingly.

Thus, the present invention can provide for the insertion of content at any point within a streaming media program, without requiring the re-encoding or re-segmentation of the entire streaming media program, by repackaging relevant chunks into corresponding pairs of a first replacement chunk and a second replacement chunk with a chunk boundary at the desired insertion point of the program. The necessary operations can be performed on the streaming media chunks in real time, or near real time, as no computationally expensive re-encoding or re-segmenting of the media data is required.

The present invention teaches a method and system of inserting content into streaming media programs to obtain a single stream broadcast, without requiring re-encoding and/or re-segmenting of the program, thus allowing the insertion point within the media program to be selected as desired. The system and method operate on the relevant chunks of the media program to repackage the chunks, as required, to provide a chunk boundary to enable the seamless playback transition between the streaming media program and the inserted content. The repackaging can be performed in near real time, if desired, permitting the dynamic insertion of content streaming programs.

BRIEF DESCRIPTION OF THE DRAWINGS

Preferred embodiments of the present invention will now be described, by way of example only, with reference to the attached Figures, wherein.

DETAILED DESCRIPTION OF THE INVENTION

As used herein, the terms streaming program and/or streaming media program are intended to broadly encompass any media program including at least digital video and/or digital audio content which is segmented for streaming and which can be rendered and played by a rendering device at the receiving end of one or more data connections. Streaming media programs can be audio programs and/or music, video on demand programs, linear video programs, live video programs or interactive programs and can be transported through the data network in any suitable manner as will occur to those of skill in the art.

Also as used herein, the term "chunk" is intended to comprise any segment, fragment or other portion into which a streaming media program is arranged into for transmission through an appropriate network by a content provider. As will be understood by those of skill in the art, chunks may also subsequently be rearranged by the transport (or other) layer (s) of the respective network (i.e.—TCP/IP packet segmentation and reassembly) but as used herein a chunk is the portion of the streaming media data as produced by the segmentation of the media program in preparation for streaming of the media program.

Further, while the following discussion refers, as an illustrative example, to the HLS protocol proposed by Apple as an IETF RFC, and to MPEG-2 transport streams being transmitted with that protocol via a TCP/IP network, the present invention is not so limited. Instead the present invention can be employed with a wide variety of streaming protocols and network protocols for delivering streaming media programs.

The current RFC for the HLS protocol is entitled "HTTP Live Streaming: draft-pantos-http-live-streaming-10" and dated Oct. 15, 2012 and the contents of this document are incorporated herein, in their entirety, by reference. The MPEG-DASH protocol, developed by the MPEG consortium, and defined in ISO/IEC 23009-1 (and incorporated by reference herein) is another example of a streaming media protocol with which the present invention can be employed and other suitable protocols exist or may be developed in the future.

Further still, as used herein the term "inserted content" is intended to comprise any media content, video and/or audio, which it is desired to insert into a streaming media program. While the most common example of inserted content may be advertising programming, it is also contemplated that other content can be inserted, if desired, and such inserted content can include: alternate endings to streaming media programs; substitution of portions of a program such as for sports "blackouts"; changes to scenes or portions of scenes within a streaming media program; TV-like "channel surfing" (where the inserted content is the main program on the channel the user has switched to); etc. As will be apparent, in the use case of TV channel surfing and others, a "stream switch" is employed as the inserted content (i.e.—the channel switched to) becomes the main media program and other content can subsequently be inserted into it.

Figure 1:
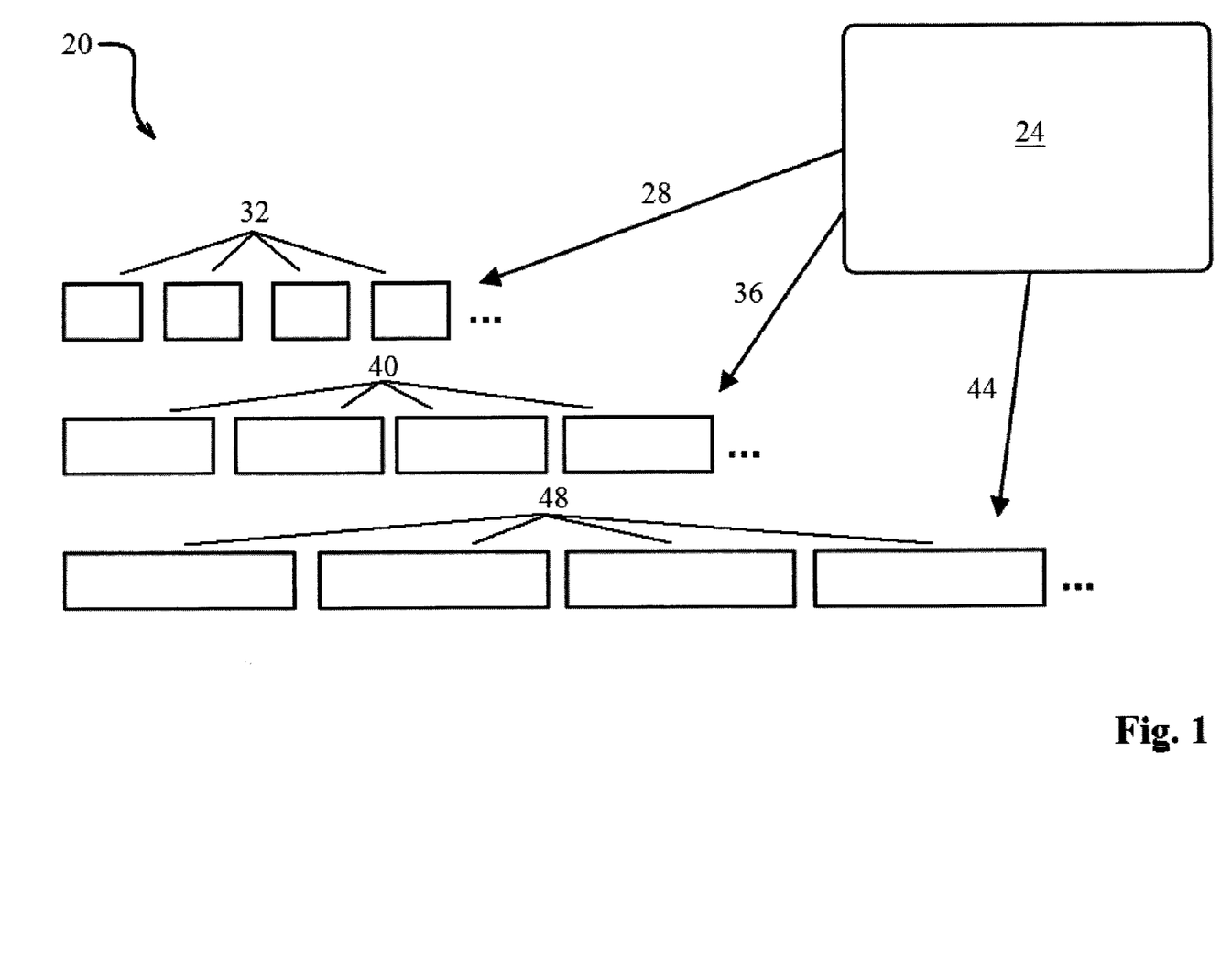
FIG. 1 shows a schematic representation of a streaming media program.

FIG. 1 shows a schematic representation of an HLS streaming media program 20 for a video on demand program. Program 20 includes a program manifest 24 which defines the content required to render the program, including any inserted content. Manifest 24 can be pre-constructed, before the program is requested by a user or other entity, or can be constructed when the program is requested. For a live streaming program, manifest 24 is created dynamically, as the program is being broadcast.

Manifest 24 comprises, amongst other things, a set of URIs (Uniform Resource Identifiers) which identify the chunks of media content which make up the program and the inserted content to be transmitted to a user. In HLS, manifest 24 can include a set of sub-manifests, each of which define the chunks of media which make up the program at different quality levels. Each set of URIs identifies the chunks representing both the main media program and the inserted content to be played and defines when each chunk should be played. In other protocols, other identifiers of the chunks of data to be rendered, and the order in which they are to be rendered, can be provided.

While such a manifest-based content delivery system is simple in concept, complexities are introduced, as described below in more detail, in that it is not straightforward for a rendering device to switch from one stream to another (the inserted content).

As mentioned above, in streaming media delivery systems the content is typically divided into a series of segments, or chunks, each of which contains the data necessary to render the audio and/or video of the streaming media for some known duration of the program. For example, each chunk may contain the necessary data to render ten seconds of the program.

Typically, manifest 24 includes URIs which identify the content of the program at different quality levels (different resolutions, compression levels, etc.) to allow the streaming of the program to be accomplished despite variations in the ability of the network to timely deliver the streamed program. In FIG. 1, manifest 24 includes a set of URIs 28 (which can be specified by a sub-manifest referenced from manifest 24) which identify low resolution content chunks 32 of the program, a set of URIs 36 (which can also be specified by a different sub-manifest) which identify medium resolution content chunks 40 of the program and a set of URIs 44 which identify high resolution content chunks 48 of the program. In response to changes in network transmission rates, or other factors, a player can switch, at a chunk boundary, from rendering the media program at one resolution/quality (for example from medium resolution stream of chunks 40) to rendering the media program at another resolution/quality (for example low resolution stream of chunks 32).

To permit stream switching between different resolutions/qualities, the chunks in all HLS streams representing a given portion of the media program contain data to render the same portion of the program. In other words, each the chunk in one stream 32 which contains the data to render a duration, i.e. Program Time ("PT")=1495 seconds to PT=1505 seconds, has a corresponding chunk in each other stream (40, 48) to render the same duration PT=1495 seconds to PT=1505 seconds at the appropriate resolution/compression. Thus, chunks in higher resolution streams contain more data than corresponding chunks in lower resolution streams, but all corresponding chunks render the same duration of the media program.

As used herein, the term Program Time is intended to comprise any suitable method of defining a playback time point in a rendered program. Depending upon the method and/or technology employed, Program Time can be expressed in seconds, fractions of seconds, a number of frames of video, etc. and the present invention is not limited to any particular representation of Program Time. For example, in systems employing MPEG2 transport streams, Program Time can be derived from any one of a number of relevant clock information sources, including the PTS information in the transport stream.

Figure 2:
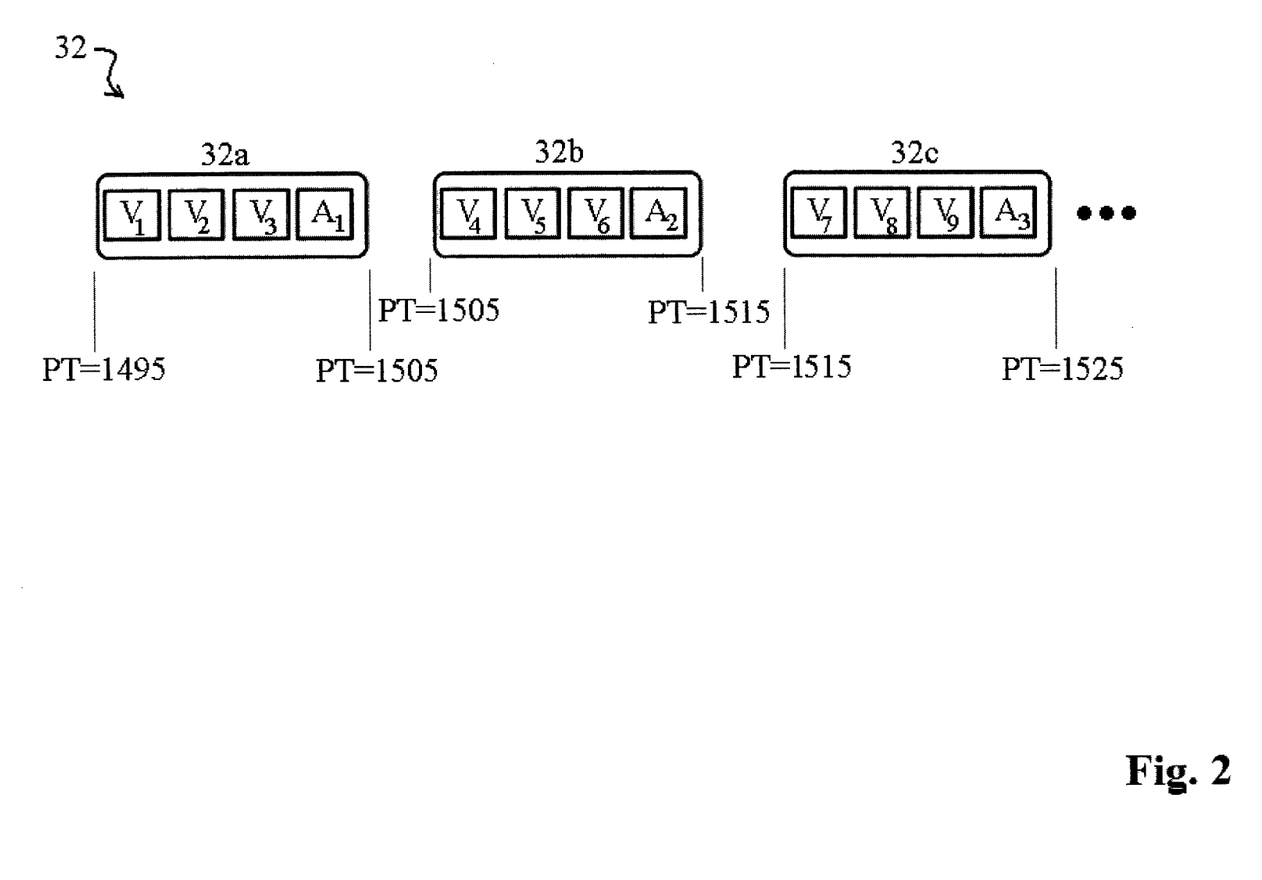
FIG. 2 shows three chunks of the streaming media program of FIG. 1.

FIG. 2 shows low-resolution stream of chunks 32 in more detail. In the illustrated example, each chunk 32a, 32b, 32c, etc. contains one or more segments of video data (V1, V2, V3, etc.) and one or more segments of audio data (A1, A2, A3, etc.). While this arrangement is illustrated for the following discussion, the present invention is not limited to any particular arrangement of the contents of chunks 32.

As mentioned above, each chunk, such as chunk 32a, will contain the data required to render a selected duration of the media program, such as ten seconds, and the duration in the example of FIG. 2 is from program time PT=1495 seconds to PT=1505 seconds. Similarly, chunk 32b contains the data required to render program time PT=1505 seconds to PT=1515 seconds and chunk 32c contains the data required to render program time PT=1515 seconds to PT=1525 seconds.

If it is desired to perform a stream switch from the main program to inserted content at program time PT=1505 seconds, the boundary (i.e.—the time point coinciding with the end of the program data rendered from chunk 32a) of chunk 32a is appropriately located and the first chunk of the inserted content can be rendered after rendering of chunk 32a has been completed, and subsequent chunks of inserted content rendered in turn. When the rendering of the inserted content is complete, playback of the main program will recommence with the rendering of chunk 32b, then 32c, etc.

However, it is not possible to insert content at a time point (for example at PT=1510 seconds) where no chunk boundary of the main program exists. In the prior art, in such a case the media program would have to be re-encoded and re-segmented with the encoder and segmenter being specifically instructed to ensure that the chunks of the main program are constructed with a chunk boundary at the desired time point (i.e. at PT=1510 seconds). As will be apparent, re-encoding and re-segmenting a media program is a time consuming process, which prevents the real time, or near real time, selection of time points at which content is to be inserted into a stream.

Accordingly, the present inventors have developed a novel system and method for enabling the insertion of content into a streaming media program which allows the time point for the insertion of the content to be decided, and/or varied, at any time prior to rendering of the streaming media program, without requiring re-encoding of the main program content.

Figure 3:
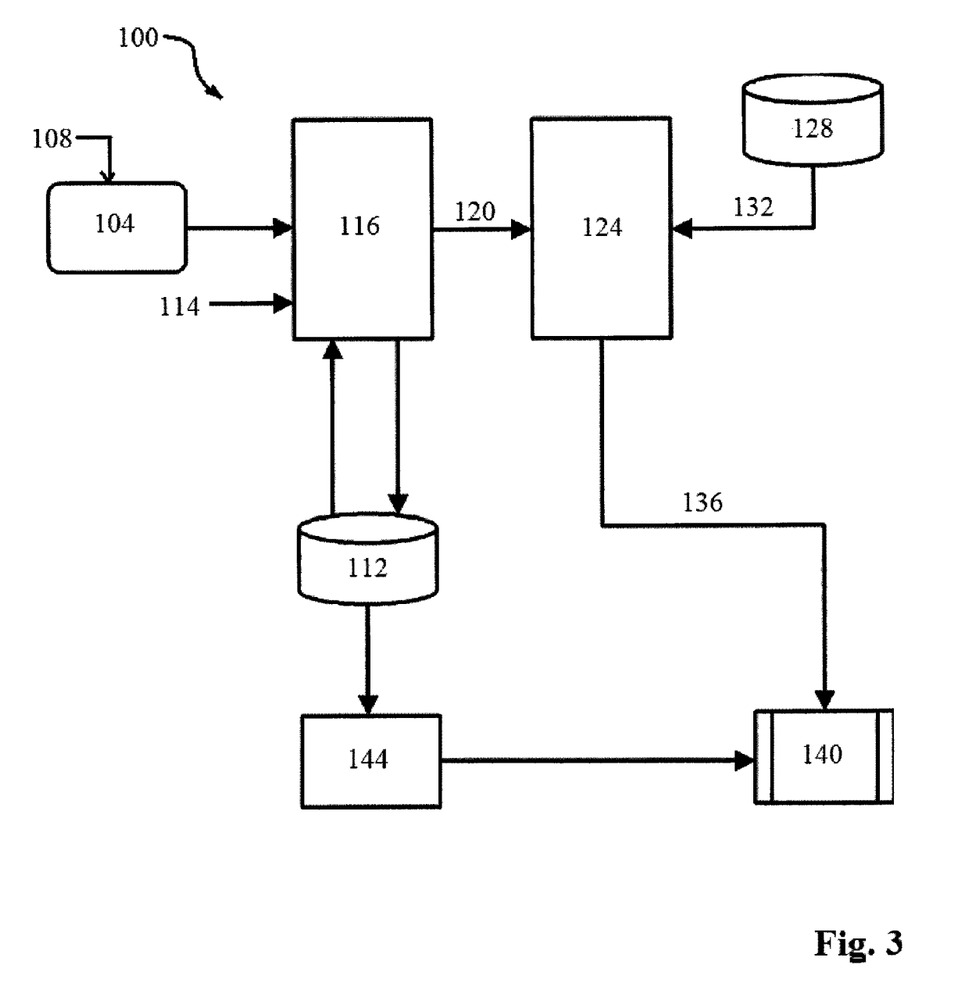
FIG. 3 shows a schematic representation of a streaming content delivery system, including a stream repackager, in accordance with the present invention.

FIG. 3 shows a schematic representation of a streaming content system 100, in accordance with an embodiment of the present invention, wherein content can be inserted into the streaming media program without requiring re-encoding of the streaming media program. System 100 can include a content information system 104, which includes metadata for available programs such as media program titles, descriptions and the time points at which it is desired to insert content into the streaming media program. When an end user, component or other entity requests a media program, for example from a video on demand network, that request 108 can be passed to content information system 104.

System 100 includes an origin server 112 which contains the media programs of system 100 which have been processed to encode the media programs at all necessary quality/resolutions/compression levels and segmented to form the corresponding chunks for the program streams.

System 100 further includes a stream repackager 116 which receives the time point information from content information system 104, or any other appropriate source, as to where in a requested streaming program it is desired to insert content into a media program and also receives the manifest 114 (or equivalent) for the requested media program (either as produced by the encoder that encoded and chunked the program contents or as subsequently modified by any other process or system which can create a manifest) which is now stored in chunks, and possibly at multiple resolutions, on origin server 112.

The operation of stream repackager 116 is described in more detail below but, simply put, it operates to retrieve the appropriate chunks of the requested program (those which contain the data to render the media program duration containing the time points of the media program where it is desired to insert content) from origin server 112 and to repackage each of those chunks to form corresponding new pairs of chunks with required chunk boundaries to allow for insertion of other content. Stream repackager 116 then makes the created pairs of chunks available to system 100, either producing those new chunks in real time when requested for download by a rendering device, or by producing them and storing them on origin server 112 or at any other accessible location within system 100.

In the case where stream repackager will produce the new chunks when requested, steam repackager defines an appropriate identifier for each new chunk to be created and creates an updated manifest 120 (or equivalent) replacing the original chunk with the identifiers for the new chunks. In the case where stream repackager 116 proactively creates the required new chunks, it creates an updated manifest 120 (or equivalent) which refers to those replacement chunks. In either case, the updated manifest 120 (or equivalent) is then passed to an insertion manager 124. Insertion manager 124 reviews updated manifest 120 to determine how many different pieces of content are to be inserted, and the duration of each piece of that inserted content, and insertion manager 124 requests the identity of the content to be inserted for each insertion point from an advertising, or other insertion, content system 128.

Advertising content system 128 responds to insertion manager 124 with information 132 representing the content to be inserted at each designated insertion point in the requested program. In the present embodiment of the invention, this information comprises an appropriate set of URIs to define the content to be inserted, but any other appropriate method of identifying such content can be employed.

The operation of advertising system 128 will not be described herein as such systems and/or other content insertion management systems are well known. The actual content to be inserted has previously been appropriately encoded and chunked and is stored in any appropriate location in system 100, such as at origin server 112. Advertising system 128 merely passes the appropriate information 132 (URIs or other suitable means of identifying and locating the content) to insertion manager 124 to identify the content to be inserted.

Insertion manager 124 then takes updated manifest 120 (or equivalent) and the insertion content URIs 132 and creates a modified playback manifest 136 (or equivalent) which can be provided to an end user player 140 which then can begin playback of the requested program, with the inserted content, by using the URIs of playback manifest 136 to download appropriate chunks of the requested program and inserted content, via a content delivery network 144, from origin server 112 or elsewhere.

As should be apparent to those of skill in the art, content delivery network 144 can be any suitable network, such as the Internet, a proprietary delivery network such as a set top box network, etc. As should also be apparent, the components of system 100 can be interconnected via any suitable digital network, such as the Internet, a private data network, etc. and the various components of system 100 need not be located at the same location.

The repackaging performed by stream repackager 116 will now be described in more detail, with reference to FIGS. 2 and 4. In this example, it is desired to insert content into the media program, containing both audio and video, defined by stream of chunks 32 and, in particular, to insert that content at program time point PT=1510 seconds. As can be seen from FIG. 2, there is no chunk boundary at PT=1510 seconds and, in fact, that time point occurs in the program duration represented by the data of chunk 32b.

In the present invention, and as described briefly above, stream repackager 116 examines the chunks 32 of a media program to identify the chunk which contains the data to render the media program at a desired insertion point. As will be apparent to those of skill in the art, the actual chunk which contains the content data for the desired insertion time point must be determined by stream repackager 116. While it is generally known from manifest 114 which chunk will contain a particular portion of the program, this specification is subject to sufficient variability, due to compression processes used in encoding the media program, that it is possible the actual time point will occur in a chunk preceding or following the chunk most expected from the manifest definitions.

Accordingly, stream repackager 116 can obtain and review more than one chunk from origin server 112 to identify the actual chunk which it needs to repackage. In this example, it is desired to insert content at PT=1510 seconds and stream repackager 116 determines that that time point is within the duration of chunk 32b.

When the required chunk has been determined, in this case chunk 32b, stream repackager 116 examines the audio segments (if any are present in chunk 32b) and the video segments (if any are present in chunk 32b) of the determined chunk to determine the audio and/or video data necessary for rendering of the media program which occurs up to the desired program time for the insertion point (in this example PT=1510 seconds) and the audio and/or video data necessary for rendering of the media program after the insertion time point.

Figure 4:
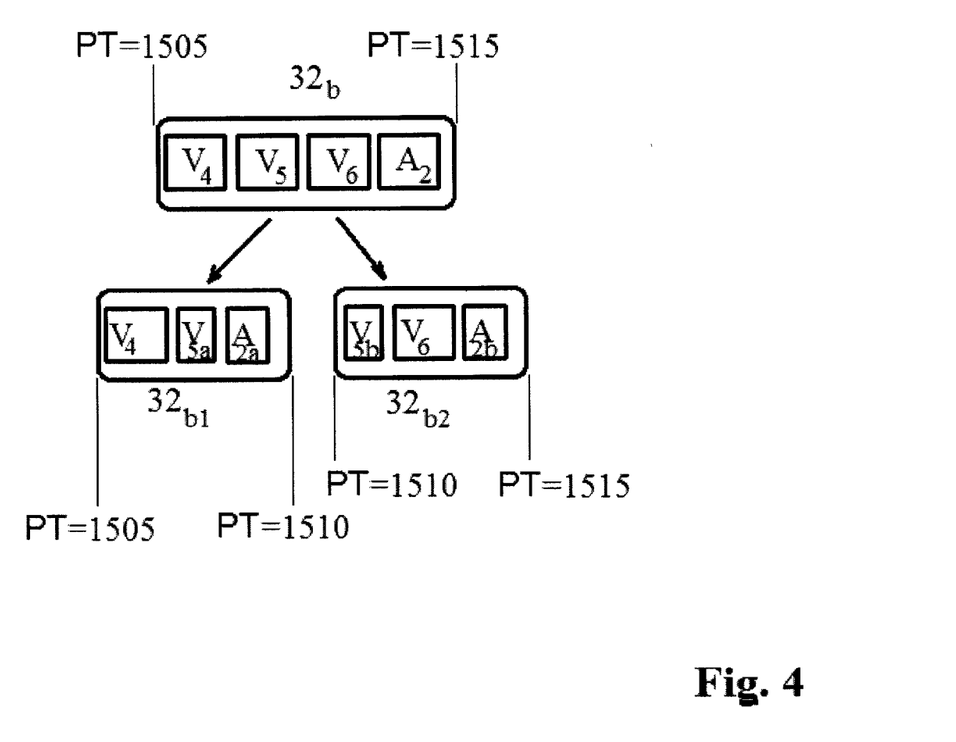
FIG. 4 shows a schematic representation of the repackaging of a specific example chunk of the streaming media program of FIG. 2.

Specifically, as shown schematically in FIG. 4, stream repackager 116 identifies the chunk 32b and the video segment (V5) of chunk 32b where the desired program time insertion point occurs (PT=1510 seconds in this example).

Next, stream repackager 116 splits the identified video segment (V5) at the desired program time point and creates two sub segments V5a and V5b, the former (V5a) of which contains all of the video data of original segment V5 to render the media program up to the desired insertion point and the latter (V5b) of which contains the video data to render the media program after the insertion point and all subsequent data of original video segment V5.

Stream repackager 116 then identifies the audio segment, in this example audio segment A2, which contains the data to render audio of the media program at the desired insertion point and stream repackager 116 splits audio segment A2 into two audio segments A2a and A2b, where audio segment A2a contains all of the data needed to render the audio of the media program for playback up to the desired insertion point and audio segment A2b contains the data needed to render the audio of the media program for playback after the insertion point and to the end of original chunk 32b.

Next, stream repackager 116 assembles new chunk 32b1, which comprises video segments V4 and V5a and audio segment A2a, and new chunk 32b2, which comprises video segments V5b and V6 and audio segment A2b. In this example, new chunk 32b1 contains the video and audio data necessary to render the media program between program time PT=1505 seconds and PT=1510 seconds and new chunk 32b2 contains the video and audio data necessary to render the media program between program time PT=1510 seconds and PT=1515 seconds.

Figure 5:
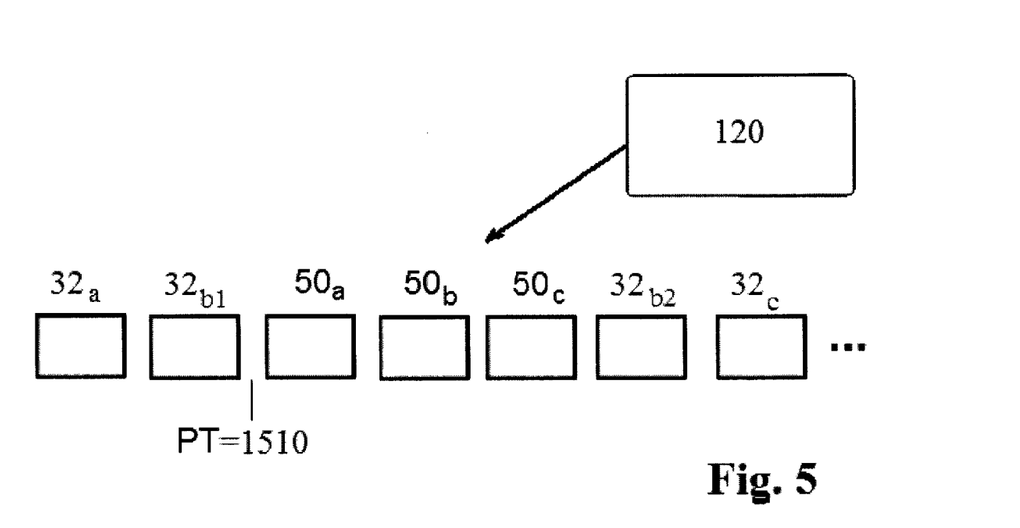
FIG. 5 shows a schematic representation of a resulting stream of chunks and inserted content after the repackaging of FIG. 4 in accordance with the present invention.

At this point, stream repackager 116 can begin creating updated manifest 120 by processing manifest 114 to replace the URI which originally identified chunk 32b to now instead point to chunk 32b1 and chunk 32b2. Because a chunk boundary now exists at PT=1510 seconds, content can be inserted at that point as desired. In the example of FIG. 5, inserted content (represented by chunks 50a, 50b and 50c) has been inserted into the main program stream between chunks 32b1 and 32b2 at the PT=1510 seconds time point and manifest 120 has been updated to have the end user rendering device play the stream comprising chunks 32a, 32b1, 50a, 50b, 50c, 32b2 and 32c, etc.

Stream repackager 116 similarly repackages each chunk of manifest 114 which includes a desired time point for inserted content. In other embodiments it is contemplated that stream repackager 116 will provide the necessary information (i.e.— which chunk(s) have been replaced with which pair(s) of chunks) to another component of system 100 which will construct the necessary updated manifest 120.

It is also contemplated that, as mentioned above, stream repackager 116 may only perform the actual repackaging of the chunk in which the desired insertion point occurs into a replacement chunks when a rendering device attempts to download one or more of those replacement chunks. In this case, stream repackager 116 will create an appropriate identifier for each of the replacement chunks to be created and will create updates manifest 120 to refer to those as yet to be created replacement chunks. When a user's rendering device attempts to download one or both of the replacement chunks, stream repackager 116 will create the requested replacement chunk, or chunks, and download them to the requesting rendering device.

In a present embodiment of the invention, stream repackager 116 is implemented as a computer software program executing on a general-purpose computer running BSD Unix. The computer includes at least one network interface which allows stream repackager 116 to read and write chunks within system 100.

As will be apparent to those of skill in the art, the actual implementation of stream repackager 116 is not particularly limited and it is contemplated that any suitable method for implementing stream packaging system 116 can be employed, as will occur to those of skill in the art, including custom hardware-based implementations and/or implementations as a process executing on other hardware within system 100 or the like.

In particular, as stream repackager 116 need not re-encode data which it is repackaging chunks, it requires relatively little in the way of computational resources and thus it can be implemented in a wide variety of manners as will occur to those of skill in the art. Further, stream repackager 116 can operate on multiple streams, enabling content insertion into streaming programs for multiple different users.

As mentioned above, programs streamed using HLS and other protocols can be offered at different resolutions and compression levels. In particular, HLS allows for player 140 to change between available resolutions/compression levels of a program during streaming playback to adjust to changing performance levels of content delivery network 144. Accordingly, in such cases the system 100 of the present invention will identify and repackage the appropriate chunk of each available stream of program content to enable the insertion of content into the streaming program, despite changes in the playback quality.

Thus, to provide for two insertion points in a program which has been encoded at three different quality/resolution/compression levels, stream repackager 116 will repackage six original chunks (two per level) into twelve new chunks (four per level) to enable the player or rendering device to change between streams of different quality levels, as desired.

As should be apparent, because stream repackager 116 does not need to re-encode video data when repackaging chunks, it can easily operate in near real time. This enables the insertion of content into streaming media to be performed in an extremely flexible manner.

For example, a premium level user requesting a program from streaming content system 100 may only have two ad breaks (ad insertion points) inserted into their program, while a lower level user may have four ad breaks inserted into the same program. With stream repackager 116, the content stored on origin server 112 need not be re-encoded and/or re-segmented by the content provider as stream repackager 116 can split the two target chunks (i.e.—those chunks containing the program duration where the desired ad insertion points occur) for the premium user and can split the four target chunks for the lower level user. Each user will receive an appropriate, and different, playback manifest 136 and will have content inserted at the appropriate time during playback.

While the example content delivery system 100 of FIG. 3 is shown as being a video on demand system, it will be apparent to those of skill in the art that the present invention applies to systems for streaming live media too. In such a case, stream repackager 116 can easily respond to a signal from the content provider, or other process participant such as a downstream broadcaster, to insert content at a particular time by repackaging one or more chunks as needed and appropriately updating the playback manifest 136. In a similar manner, the present invention can also enable the insertion of content into a streaming program after streaming of that program has commenced, provided only that the manifest (or equivalent) can be updated after playback has commenced.

Thus, the present invention can provide for the insertion of content at any point within a streaming program, without requiring the re-encoding and/or re-segmenting of the streaming program, by repackaging relevant chunks into pairs of chunks with a chunk boundary at the desired insertion point of the program. The necessary operations can be performed on the streaming media chunks in real time, or near real time, as no computationally expensive recoding or re-segmenting of the video data is required.

The present invention teaches a method and system of inserting content into streaming media programs via single stream broadcast without requiring re-encoding or re-segmenting of the entire program, thus allowing the insertion point within the media program to be selected as desired. The system and method operate on the relevant chunks of the media program to repackage those chunks, as required, to provide a chunk boundary to enable seamless playback of the streaming media program and the inserted content. The repackaging can be performed in near real time, if desired, permitting the dynamic creation of a single stream including the inserted content and the main program.

The above-described embodiments of the invention are intended to be examples of the present invention and alterations and modifications may be effected thereto, by those of skill in the art, without departing from the scope of the invention which is defined solely by the claims appended hereto.

We claim:

1. A method for inserting content, comprising:
  receiving, by a stream repackager executing on one or more processors, streaming content defined by a program manifest comprising a plurality of resource identifiers of a corresponding plurality of chunks;
  identifying, by the stream repackager, a chunk of the streaming content including data to render the streaming content at a specified time point, the specified time point between an initial time point of the chunk and an end time point of the chunk;
  splitting, by the stream repackager, the identified chunk to form a first replacement chunk and a second replacement chunk, the first replacement chunk comprising the data of the identified chunk to render the streaming content from the initial time point to the specified time point and the second replacement chunk comprising the data of the identified chunk to render the streaming content from the specified time point to the end time point; and
  updating, by the stream repackager, the program manifest to replace a resource identifier corresponding to the identified chunk with resource identifiers corresponding to the first replacement chunk and second replacement chunk.

2. The method of claim 1, wherein receiving the streaming content further comprises receiving the streaming content in at least one of a first quality level and a second quality level, the streaming content in the first quality level comprising a first plurality of chunks comprising data to render the streaming content at the first quality level, and the streaming content in the second quality level comprising a second plurality of chunks comprising data to render the streaming content at the second quality of data.

3. The method of claim 1, wherein generating the first replacement chunk and the second replacement chunk further comprises generating the first replacement chunk and the second replacement chunk, responsive to receiving from the the end user device a request for the identified chunk.

4. The method of claim 1, further comprising
receiving, by the stream repackager, a resource identifier corresponding to a supplemental content chunk to be inserted at the specified time point; and
updating, by the stream repackager, the program manifest to include the resource identifier corresponding to the supplemental content to be inserted between the resource identifier corresponding to the first replacement chunk and the resource identifier corresponding to the second replacement chunk.

5. The method of claim 1, wherein receiving the streaming content further comprises receiving the streaming content by the stream repackager intermediary to a media program server, a media program database, a content source server, and an end user device.

6. A stream repackaging system for processing streaming media programs, comprising:
a computing device including at least one processor and a memory that:
receives, via a network interface, streaming content defined by a program manifest comprising a plurality of resource identifiers of a corresponding plurality of chunks, each of the plurality of chunks corresponding to data to render the segment of the streaming content;
receives a request to enable the insertion of content at a specified time point within the streaming content;
identifies, responsive to receiving the request to enable the insertion of the content, a chunk of the streaming content corresponding to the data to render the streaming content at the specified time point, the specified time point between an initial time point of the chunk and an end time point of the chunk;
splits the identified chunk to form a first replacement chunk and a second replacement chunk, the first replacement chunk comprising the data of the identified chunk to render the streaming content from the initial time point to the specified time point and the second replacement chunk comprising the data of the identified chunk to render the streaming content from the specified time point to the end time point; and
updates the program manifest to replace resource identifiers corresponding to the identified chunk with resource identifiers corresponding to the first replacement chunk and the second replacement chunk.

7. The stream repackaging system of claim 6, wherein the the computing device generates the first replacement chunk and the second replacement chunk, responsive to receiving from an end user device a request to download the identified chunk.

8. A streaming content delivery system, the system comprising:
a media program information database that stores at least metadata describing a specified time point;
a media program server that stores streaming content defined by a program manifest comprising a plurality of resource identifiers of a corresponding plurality of chunks;
a stream repackager executing on one or more processors that:
receives, from the media program server, the streaming content,
receives a request to enable the insertion of content at the specified time point within the streaming content,
receives, from the media program information database, the specified time point,
identifies, responsive to receiving the request to enable the insertion of content, a chunk of the streaming content corresponding to the data to render the streaming content at the specified time point, the specified time point between an initial time point of the chunk and an end time of the chunk,
splits the identified chunk to form a first replacement chunk and a second replacement chunk, the first replacement chunk comprising the data of the identified chunk to render the streaming content from the initial time point to the specified time point and the second replacement chunk comprising the data of the identified chunk to render the streaming content from the specified time point to the end time point, and
updates the program manifest to replace resource identifiers corresponding to the identified chunk with resource identifiers corresponding to the first replacement chunk and the second replacement chunk;
an insertion manager executed on the one or more processors that sends, to the stream repackager, a resource identifier corresponding to a supplemental content chunk to be inserted at the specified time point, wherein the stream repackager updates the program manifest to include the resource identifier corresponding to the supplemental content to be inserted between the resource identifier corresponding to the first replacement chunk and the resource identifier corresponding to the second replacement chunk; and
a content delivery network, communicatively connected to the stream repackager, that delivers the modified program manifest to an end user device;
wherein the end user device downloads the plurality of chunks and the inserted supplemental content via the content delivery network and renders the streaming content and the inserted supplemental content based on the updated program manifest.

9. The system of claim 8 further comprising a content insertion system that stores the supplement content to be inserted at the specified time point.

* * * * *